Patented Jan. 19, 1954

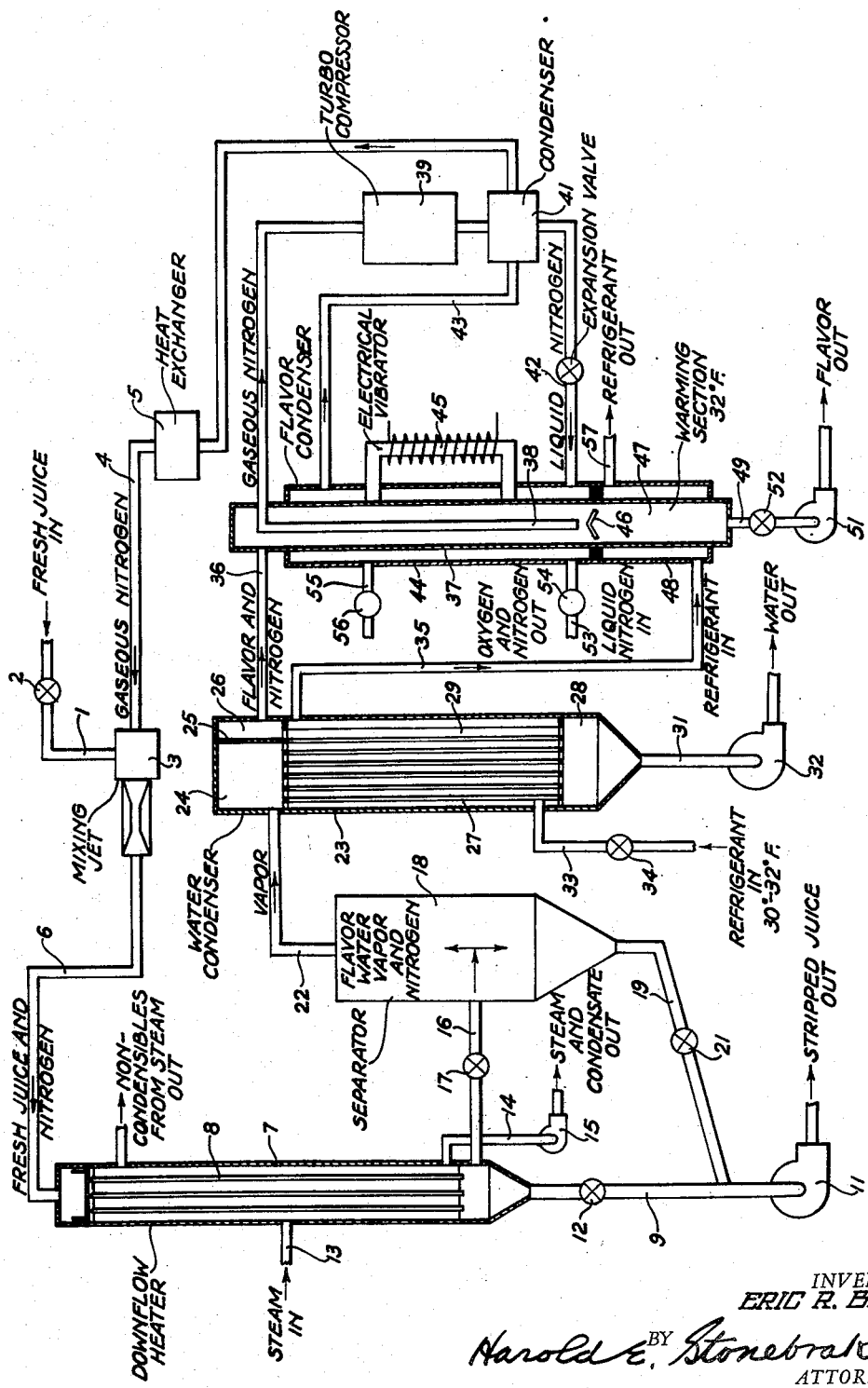

2,666,707

UNITED STATES PATENT OFFICE 2,666,707

METHOD FOR RECOVERING ESTERS AND OTHER VOLATILE COMPONENTS

Eric R. Beu, Albion, N. Y.

Application June 24, 1950, Serial No. 170,207

8 Claims. (Cl. 99—140)

This invention relates to a method and apparatus for removing esters and other volatile components of flavors and aromas from any solid, semi-solid, liquid, semi-liquid, gas, or other fluid, with more particular reference to recovering the natural aroma and flavoring from orange juice and other fruit and vegetables juices and liquid foods, and it has for its purpose to afford a method by which the esters and other flavor and aroma components in a fruit juice or liquid food can be successfully removed before evaporation or dehydration and thereafter added to the concentrated product so as to restore substantially the entire volume of flavor and aroma components and thus produce a concentrate which when added to water produces a beverage or food that possesses substantially the same flavor and aroma characteristics as the juice in its original and natural state.

The general practice in concentrating orange juice has been to retain about 10% of the total volume in its natural state and mix such 10% with the concentrate produced from the remaining 90%, in order to simulate the flavor and aroma of the original juice, but a large percentage of the aroma and flavor components are lost in condensing the water of the 90% or large total volume from which the concentrate is formed, and it is a particular purpose of the invention to afford a procedure that enables removing from the entire volume of juice in the first instance substantially all of the flavor and aroma components, these volatile components being contained in a very small volume of approximately one-tenth of 1% of the total volume of juice, so that the remaining 99.9% volume of juice can be concentrated without losing or affecting the aroma and flavor components, which are recovered from the juice before the concentration operation so that they may be added to the concentrate after the latter is produced, and when combined in proper proportions with the concentrate maintain in the concentrate substantially the same fresh flavor and aroma as in the juice in its natural state.

The invention also has for an objective to enable removing aromas, odors, or scents from solids, semi-solids, liquids, semi-liquids, gases, or other fluids and condensing the esters or other components forming the aromas, odors and scents into a concentrate or extract that can be used as desired.

Still a further purpose of the invention is to afford an apparatus that can be successfully employed to remove esters and other volatile components of flavors and aromas from a gaseous material that has been previously mixed with said volatile components, taking the place of the water, air or other carrier of such components, and acting to convey them to suitable condensers in which the esters and other flavor and aroma components are condensed and recovered.

The invention in its general aspect consists in supplying to a liquid, juice, or other substance an excess amount of non-condensable gas which picks up the volatile flavor and aroma components, and from which the flavor and aroma components are recovered, utilizing for this purpose a gas that is inert and non-reactant at temperatures of approximately 60° F. and below, such as nitrogen, or any other inert gas, while maintaining the liquid or juice and gas at a pressure slightly higher than the equilibrium vapor pressure at the freezing point of the fluid undergoing treatment.

Such gas is mixed with a volume of orange juice or other fruit juice, or liquid, and the mixed liquid and gas conducted through a continuous evaporator comprising a heater and separator, or through a suitable packed tower or other desorption unit. The gas acts to remove and carry off the volatile components of the flavor and aroma, which volatile components or vapors from evaporation are carried by the nitrogen or other gas at a temperature of approximately +32° F. or above to a surface condenser that is chilled by a refrigerant having a temperature of approximately +32° F. to —40° F. and in which the larger part of the water and relatively lower boiling fractions are removed and carried off continuously while the gas with the flavor and aroma components are conducted thence to a second condenser where they are subjected to a refrigerant at a very low temperature of approximately from +32° to —459° F., causing the flavor and aroma esters and other components to crystallize and adhere to the wall of the condenser in the form of snow.

This snow or crystal formation is removed in any suitable fashion as by an electrical vibrator, causing the crystals to fall to a warming chamber at the bottom of the condenser and beneath a suitable baffle located under the gas outlet, the aroma and flavor component crystals being liquefied in the warming chamber and drawn off continuously for mixing with the concentrate that is produced by any conventional methods, while the nitrogen or other gas is conducted from the last mentioned condenser through a suitable source of vacuum and returned in a continuous circuit, first in liquid form to chill the last mentioned condenser and then in gaseous form to be mixed with the incoming juice or liquid. The flavor and aroma recovery process may be carried out separately from the concentration of such substances, or in conjunction with the concentration process if preferred, and the nitrogen may be recirculated, or a fresh supply of liquid nitrogen introduced for each cycle, if desirable.

To these and other ends, the invention consists in the method and apparatus that will appear more clearly from the following description when read in conjunction with the accompanying drawing, the novel features being pointed out in the claims following the specification.

The drawing is a diagrammatic view of an apparatus illustrative of one method of carrying out the process forming part of the subject matter of the invention.

The method forming part of the invention may be performed with various types and arrangements of apparatus, and in order to illustrate one practical embodiment, there is shown a structure including an inlet pipe 1 for orange or other fruit juice or liquid, controlled by valve 2, and communicating with a mixing chamber 3, into which leads a pipe 4 for conducting nitrogen gas at a temperature of —40° F. or above, a suitable heat-exchanger 5 being employed for such purpose, the gas being thus mixed with the fruit juice or liquid in the mixing chamber 3.

Satisfactory results are obtainable with nitrogen gas although any gas may be used that is inert or non-reactant at low temperatures with orange juice or other fruit or vegetable juices or liquids, such as helium, argon, xenon, krypton, or carbon dioxide, or any mixtures of these, or air or other gas which when mixed function to remove the esters and other flavor and aroma components from the liquid by desorption and carry them to the point where the esters and other flavor and aroma components are condensed out of the gas at low temperatures into the form of crystals or snow and recovered in liquid form.

After the gas and liquid are brought together, the mixture is conducted through a pipe 6 to a suitable heat-exchanger in the form of a downflow heater 7, the mixture of nitrogen gas and liquid being carried through the pipes 8 of the heater and the stripped liquid or juice is conducted away from the heater through a pipe 9 by a suitable flexible impeller pseudo-positive action pump, such as a Jabsco pump, as indicated at 11. 12 designates a valve for controlling the flow through pipe 9, and steam is introduced into the chamber surrounding the pipes 8 through an inlet 13, the steam condensate being carried off through pipe 14 by a centrifugal pump or other suitable means indicated at 15.

Steam is introduced through inlet 13 at a temperature of +32° F. or above while the juice or aqueous liquid enters the heater at a temperature between 0° F. and +70° F., and the inert gas at a temperature between +32° F. and —459° F. depending on the particular gas used. After passing through the heat-exchanger just described from which the major part of the juice or liquid is stripped from the flavor and aroma components, the gas together with the flavor and aroma components travel through the pipe 16 controlled by valve 17 to a separator 18, moving upwardly in the latter while the stripped liquid or juice is carried downwardly through pipe 19 controlled by valve 21 to the previously mentioned discharge pipe 9 leading from the heater 7, substantially all of the stripped juice being carried off in this fashion through pipes 9 and 19 by pump 11, while the nitrogen gas or other gaseous carrier moves upwardly through pipe 22 and to a condenser which will be described presently.

In actual operation, it has been found that the nitrogen or other non-condensable gas removes by desorption approximately .1% of the total volume of orange juice or other liquid passing through the heater and separator just described, the esters and other flavor and aroma components being contained in this relatively small proportion of the total volume of juice, while approximately 99.9% of the total volume of juice is stripped and carried off through the pipes 9 and 19, the stripped juice or liquid being concentrated to any extent desired by conventional methods either into liquid or powdered concentrate form, and the flavor and aroma components which are recovered from the relatively small volume of liquid in the manner that will be described presently can then be added to the stripped juice to produce a final concentrate which, when water is added at the time of using, will reproduce the flavor and aroma characteristics of the original or natural juice.

Instead of the heater and separator just described, the flavor and aroma components may be removed from the juice or liquid by any other desorption method or apparatus suitable for the purpose, such for instance as a packed tower in which the juice or liquid and non-condensable gas travel in opposite directions through a mass of ceramic or other suitable non-reacting packing material, the nitrogen gas acting to remove the volatile esters and other flavor and aroma components from the fruit juice or liquid and carry them on to the recovery point in the manner that will now be described.

The mixture of nitrogen gas and flavor and aroma components is carried through the separator 18 and the remainder of the system to be described by a suitable pump or other source of vacuum which maintains a pressure throughout the system slightly higher than the equilibrium vapor pressure at the freezing point of the fluid undergoing treatment, and in order to effect the desired condensation of the flavor and aroma components, the gas is then conducted through the pipe 22 to a condenser, indicated generally at 23 and including an inlet chamber 24 at the top provided with a vertical baffle 25 separating the inlet chamber 24 from an outlet chamber 26.

27 designates a multiplicity of inlet passages or conductors in the condenser 23 communicating with the inlet chamber 24 and extending downwardly to a chamber 28 at the bottom of the condenser, while 29 designates a single outlet passage leading from the bottom chamber 28 upwardly to the outlet chamber 26. 31 designates a pipe extending downwardly from the bottom chamber 28 and controlled by a pump 32 to carry off continuously such water and other relatively low boiling fractions as may be condensed in the chamber 28.

This condenser 23 is not necessarily restricted to any specific number of inlet and outlet passages or relationship between them, the main objective being to afford a relatively large condensing surface against which the incoming gas strikes and a relatively small condensation surface in the passage through which the outgoing gas travels from the condenser, this arangement affording maximum efficiency and maximum condensing action.

Surrounding the conducting passages 27 and 29 is a jacket affording a chamber for a refrigerant such as brine which enters through the pipe 33, controlled by valve 34, and is carried off at the top of the refrigerant chamber through pipe 35 for a purpose that will presently appear, and the refrigerant is conducted to the condenser at a temperature of between —40° F. and +32° F., while the nitrogen gas and flavor and aroma components are maintained at a temperature of between —40° F. and +32° F. while in the condenser. Substantially all remaining water or liquid or other relatively lower boiling fractions are removed from the gaseous carrier by the condenser 23, leaving only the flavor and aroma components to be conducted to a second condenser where they are removed from the gas in the manner that will now be described.

To effect this, the pipe 36 leading from the outlet chamber 26 of condenser 23 connects with the top of a second condenser or trap 37, while 38 designates a gas outlet pipe leading from near the bottom of condenser 37 upwardly and outwardly from the condenser to a suitable turbocompressor or other pump 39 which maintains the required low pressure throughout the system and compresses the nitrogen to a higher pressure than that existing in the system. The nitrogen gas at such higher pressure then passes through a suitable condenser 41 which liquefies the compressed nitrogen and thence through expansion valve 42 which controls the degree of refrigeration in the condenser trap. The condenser 41 may be cooled by gaseous nitrogen which passes through the pipe 43 from chamber 44 surrounding the condenser, and which then passes from condenser 41 to the inlet pipe 4 to the mixing chamber 3 where the juice is introduced. The liquid nitrogen travels from expansion valve 42 to the chamber 44 surrounding the condenser 37 to effect the necessary chilling.

The liquid nitrogen which flows through the jacket or chamber 44 is at a temperature of —344° F. and above, causing the esters and other volatile flavor and aroma components which are maintained at about the same temperature to crystallize on the inside of the wall of the condenser in the form of a light snowlike material while the nitrogen gas is carried off through the pipe 43 as already described.

45 designates an electric or other suitable vibrator attached to the wall of the condenser 37 and operating to loosen the crystals or snow as they form on the wall of the condenser, and permit them to fall by gravity downwardly and around the edges of a baffle 46 located immediately under the lower end of gas outlet pipe 38, and into a warming chamber 47 which is surrounded by a jacket or chamber 48, to which is connected the aforementioned pipe 35 leading from the refrigerant chamber of condenser 23.

Thus the refrigerant or brine passing through pipe 35 maintains the walls of the warming chamber 47 at a temperature of approximately +32° F., causing the snow or crystals constituting the flavor and aroma components to liquefy in the warming chamber 47, whence they are continuously conducted off through a pipe 49 by a pump 51 of the Jabsco type already described while 52 designates a controlling valve in pipe 49.

53 designates a pipe communicating with the lower part of the jacket or chamber 44 and controlled by a pump 54 that is manually or automatically operable to remove such excess oxygen, nitrogen and other liquids as may accumulate in the system, while 55 designates a pipe controlled by a pump 56, which is operated manually or automatically to remove such excess gases as may accumulate in the system. If additional liquid nitrogen is required, it can be supplied from any suitable source through the pipe 53 and pump 54, which is reversible in operation. 57 is an outlet pipe for conducting refrigerant from the warming chamber 47.

The operation of the apparatus briefly is as follows: Fruit and vegetable juice or other liquid from which it is desirable to recover flavor and aroma components is introduced through the pipe 1 into a mixing chamber 3 where it is combined with nitrogen or other gas, and the mixture conducted to the heat-exchanger or downflow heater 7 and separator 18. Approximately 99.9% of the total volume of juice or liquid is stripped in evaporator 7 and separator 18 and carried off, while the remaining .1% of the total volume in the form of a small amount of water and volatile flavor and aroma components are carried on by the nitrogen or other gas to condenser 23 from which most of the water and relatively lower boiling fractions are removed.

The remaining esters and other volatile flavor and aroma components are carried by the nitrogen gas to condenser trap 37 where they are subjected to very low temperatures which cause the esters and flavor and aroma components to collect on the wall of the trap in the form of snow or crystals, which are loosened from the wall of the trap in any suitable fashion, as by an electric vibrator, and fall thence downwardly into the warming chamber where they are subjected to the action of a warming fluid which liquefies the crystals. The flavor and aroma components are drawn off from the warming chamber continuously to be mixed with the concentrate from the juice or liquid, from which they have been previously separated.

Thus substantially nothing is removed or lost from the juice but water, and when water is added to the concentrate at the time of use, the juice or liquid is restored to its original state and the juice possesses the same fresh flavor and aroma which characterized it in its natural state. The nitrogen or other gas is carried off from condenser trap 37 and liquefied by condenser 41, after its pressure is raised by the compressor 39, and then passes through expansion valve 42 and returns to the refrigerant chamber 44 around the condenser 37, and is then ready for repeating the cycle as described.

The invention has the additional advantage of deaerating the juice or liquid and removing substantially all oxygen, thus increasing the stability of the flavor of the product. The invention is also applicable in the removal of flavor and aroma components from any liquids or from the air as in the case of separating aroma components from an atmosphere heavily laden with an aroma that it is desirable to recover, such for instance as the fragrance of gardenias, roses, or other flowers in a greenhouse, room, or chamber, in which case it is possible to introduce nitrogen or other gas into such room or chamber and pick up and carry off the aroma components, which can be condensed and recovered in the manner previously described, and subsequently used by mixing with a concentrate, extract, or in any other desirable manner.

The force which drives the volatile components into the inert gas stream is the greater vapor pressure of the volatile components as compared with the vapor pressures of the water or other liquid or less volatile components in the material under treatment. This driving force is magnified both by low absolute pressure and heat in the heater-type desorption unit and by low absolute pressure alone in the packed tower desorption unit.

While the invention has been described with reference to the particular construction herein shown and the method described, it is not confined to the exact arrangement, details, or procedure set forth since the method and structure are susceptible of changes and modifications without departing from the essential features of the invention, and this application is intended to cover such adaptations or modifications as may come within the purposes of the improvements and the scope of the following claims.

I claim:

1. The method of continuously recovering esters and other volatile components of flavors and aromas from a fluid which consists in continuously mixing with the fluid a normally non-condensable gas, continuously separating said gas with the volatile flavor and aroma components from the mixture while the latter is maintained at a sub-atmospheric pressure, continuously removing said fluid from the mixture, continuously conducting said gas with the stripped volatiles and condensable vapor in co-current relationship away from said mixture and removing the condensable vapor therefrom, thence conducting the stripped volatiles and gas in co-current relationship to a point where the volatiles are separated from the non-condensable gas in the form of solid crystals, and converting said crystals into a fluid.

2. The method of continuously recovering esters and other volatile components of flavors and aromas from a fluid which consists in continuously mixing with the fluid a normally non-condensable gas, continuously separating said gas with the volatile flavor and aroma components from the mixture while the latter is maintained at a temperature of not lower than 0° F. and at a sub-atmospheric pressure, continuously removing said fluid from the mixture, continuously conducting said gas with the stripped volatiles and condensable vapor in co-current relationship away from said mixture and removing the condensable vapor therefrom while subjecting the gas and volatiles to a temperature of not higher than 32° F., thence conducting the stripped volatiles and gas in co-current relationship to a point where they are subjected to a temperature of below 32° F. and the volatiles are separated from the non-condensable gas in the form of solid crystals, and converting said crystals into a fluid.

3. The method of continuously recovering esters and other volatile components of flavors and aromas from a fruit juice which consists in continuously mixing with the juice a normally non-condensable gas, continuously separating said gas with the volatile flavor and aroma components from the mixture while the latter is maintained at a temperature of not lower than 0° F. and at a sub-atmospheric pressure, continuously removing the fruit juice from the mixture, continuously conducting said gas with the stripped volatiles and condensable vapor in co-current relationship away from said mixture and removing the condensable vapor therefrom while subjecting the gas and volatiles to a temperature of not higher than 32° F., thence conducting the stripped volatiles and gas in co-current relationship to a point where they are subjected to a temperature of below 32° F. and the volatiles are separated from the non-condensable gas in the form of solid crystals, and converting said crystals into a juice.

4. The method of continuously recovering esters and other volatile components of flavors and aromas from orange juice which consists in continuously mixing with the orange juice a normally non-condensable gas, continuously separating said gas with the volatile flavor and aroma components from the mixture while the latter is maintained at a temperature of not lower than 0° F. and at a sub-atmospheric pressure, continuously removing the orange juice from the mixture, continuously conducting said gas with the stripped volatiles and condensable vapor in co-current relationship away from said mixture and removing the condensable vapor therefrom while subjecting the gas and volatiles to a temperature of not higher than 32° F., thence conducting the stripped volatiles and gas in co-current relationship to a point where they are subjected to a temperature of below 32° F. and the volatiles are separated from the non-condensable gas in the form of solid crystals, and converting said crystals into juice.

5. The product produced by the method of claim 1.

6. The product produced by the method of claim 2.

7. The product produced by the method of claim 3.

8. The product produced by the method of claim 4.

ERIC R. BEU.

References Cited in the file of this patent

UNITED STATES PATENTS

| Number | Name | Date |
|---|---|---|
| 1,251,359 | Etaix | Dec. 25, 1917 |
| 1,367,726 | Trigg | Feb. 8, 1921 |
| 2,018,049 | Allen | Oct. 22, 1935 |
| 2,145,395 | Horvath | Jan. 31, 1939 |
| 2,306,061 | Johnson | Dec. 22, 1942 |
| 2,423,746 | Zahm | July 8, 1947 |
| 2,510,138 | Pulley et al. | June 6, 1950 |
| 2,512,513 | Zahm | June 20, 1950 |
| 2,513,813 | Millerville | July 4, 1950 |

FOREIGN PATENTS

| Number | Country | Date |
|---|---|---|
| 246,454 | Great Britain | 1926 |
| 289 | Australia | 1926 |